UNITED STATES PATENT OFFICE 1,963,540

PROCESS OF PRODUCING A UNIFORMLY COLORED CEMENT

Anthony L. Asher and Walter G. Meyer, Milwaukee, Wis.

No Drawing. Application February 12, 1934, Serial No. 710,958

5 Claims. (Cl. 106—24)

This invention relates to a process of producing a uniformly colored cement, and is a continuation in part of a prior application for Letters Patent, Process of mixing cement and colored powder, Serial No. 599,340, filed March 16, 1932.

Before the discovery of the instant process of producing a uniformly colored cement, various attempts to obtain such a product have been made but have resulted in a concrete having an uneven or streaky appearance, and a wear surface readily marred by checking, dusting, and cracking etc.

We have found from actual experience that the primary cause of a weakened wear surface is due to the differences in apparent specific gravity of the cement and coloring matter, which latter has a tendency to separate and rise to the surface of the concrete in its plastic state under the influence of varying pressures applied by the workmen in troweling or floating the surface of the concrete.

A primary object of this invention, therefore, is to produce a uniformly colored cement from which the color will not separate under the varying pressures applied during the working of the concrete while the same is in its plastic state.

Another important object of this invention is to produce a uniformly colored cement in which surface imperfections are eliminated to a marked degree.

Another important object of this invention is to produce a colored cement which results in a product of increased durability due to the uniform blending of the coloring matter with the other materials forming the mix.

Still another important object of this invention is to produce a uniformly colored cement which may be readily manufactured and placed upon the market at a reasonable cost.

These and other objects and advantages will be apparent throughout the course of the following specification and claims.

Before proceeding with a detailed description of our process, it is well to note that standard Portland cement has an average specific gravity of substantially 3.1, while the specific gravity of the various coloring materials will vary with respect to the specific gravity of cement. For example, in the use of commercial products, a cubic foot of true Portland cement has a specific gravity of substantially 3.1 and weighs approximately 94 pounds, and has a fineness of modulus of substantially 78%, 200 mesh, while a cubic foot of red oxide of iron ($Fe_2O_3$) has a specific gravity of substantially 5.2 and weighs approximately 70 pounds, and has a fineness of modulus of substantially 98%, 325 mesh. Construed in the light of solids, an equal volume of color is heavier than a like volume of cement, whereas, when considered as commercial products, an equal volume of cement is substantially heavier than that of the coloring matter though the respective actual specific gravity of each would remain the same as that of the solid. It is therefore to be noted that the specific gravity of coloring matter is considerably greater than that of the cement, and an ordinary mix thereof results in a definite separation of these materials if pressure is applied in working the materials after the same have been brought together in a plastic mass.

By our process we have succeeded in overcoming the foregoing serious objections, by combining the cement and coloring matter so as to eliminate the apparent differences between these two materials.

This we accomplish by reducing the fineness of Portland cement to the point where it will be lifted or floated in a gaseous media having the same force as that required to lift or float the coloring matter, or in other words by treating the cement and if necessary coloring matter so that they will equally float or remain in uniform suspension in the same gaseous media.

While in some instances grinding of the coloring matter is not necessary, still in other instances it may be, for example where the coloring matter is in lumps or such that it will not mix with the cement to form a mix of uniform cross-section throughout.

The term Portland cement as herein employed is construed by us to mean the ground commercial product, or the raw material or clinker from which cement is manufactured. It will thus be seen that our result may just as readily be obtained by initially grinding the raw material or clinker to produce cement and then continuing the grinding to a point where it will be equally suspended in the same gaseous media as the coloring matter with which it is to be used.

The average specific gravity of Portland cement is approximately 3.1, whereas, the average specific gravity of chemically pure oxide colors, is approximately 5.2. In equal volumes of these two materials, as commercial products the cement is considerably heavier. That is, a cubic foot of true Portland cement weighs approximately 94 pounds, while a cubic foot of the average chemically pure oxide color weighs approximately 70 pounds.

One method by which this result can be obtained is in placing the cement and color in their proper proportions in the grinding chamber of a grinding mill. The ground product of this mill is drawn from the grinding chamber, through a pipe by means of a gaseous medium.

The force or suction of the gaseous medium is then adjusted to the exact point wherein the force or suction of the gaseous medium is sufficient to draw the coloring material from the grinding chamber. The cement, now remaining in the grinding chamber, is ground to the exact point where it is also drawn from the grinding chamber by the same gaseous medium that drew out the coloring matter. During the entire process, force or suction of the gaseous medium remains constant or is not changed from its original volume required for drawing out the coloring matter.

Due to the variation in specific gravity of various coloring materials, we reduce Portland cement to the fineness required in each separate case so that the cement powder will be drawn out of the grinding chamber by the gaseous medium required to draw out the coloring material used. By our method we have found that the fineness of the powdered cement processed will vary in fineness in the exact ratio of the variation in specific gravity of the various coloring materials.

It is also within our invention to float color and cement in or by the gaseous mediums of equal pressure in isolated mills which might be connected or entirely separated. In the use of separate or isolated mills we may float the color from the grinding chamber of the mill and the cement from the grinding chamber of the other mill.

As to just what takes place in producing uniformly colored cement in accordance with our invention is more or less problematical, but so far as we have been able to ascertain can best be stated by saying that we reduce the Portand cement to an extent where same has a specific gravity apparently the same as that of the coloring matter.

We have conducted comparative tests under the old practice in the art and under our method, as follows:—

1. A test tube was one-half filled with equal parts of cement and coloring matter both of commercial form following which the tube was shaken to mix the two ingredients. The tube was then filled with water and again shaken to effect a thorough mix. The tube was next placed in a rack and permitted to remain for about 48 hours. At the end of that time it was found the bulk of the coloring matter had settled on top of the cement.

2. The same test was conducted in accordance with the instant invention, wherein the cement and coloring matter are processed to float equally in the same gaseous media of equal velocity, and at the end of time noted it was found that the two ingredients had not separated, or are thoroughly blended so that the coloring matter appears and remains uniformly throughout the entire mix.

The foregoing method, by which our invention may be practiced, are set forth by way of example and not exhaustive enumeration of all methods by which the invention may be practiced.

We claim:—

1. That step in the process of manufacturing a uniformly colored cement, which resides in grinding cement clinker to produce cement and then continuing the grinding to a point where the cement will float in a like gaseous medium of equal velocity with the coloring matter employed, and then mixing same with the coloring matter.

2. A cementitious material including cement and coloring matter each having substantially equal flotation in a like gaseous media of equal velocity.

3. That step in the process of manufacturing a uniformly colored cement which consists in grinding the coloring matter and the cement so that they will float equally in a gaseous medium of equal velocity.

4. That step in the process of manufacturing a uniformly colored cement which consists in separately grinding the coloring matter and cement so that both will float equally in a gaseous medium and finally mixing the coloring matter and cement together.

5. The process of producing cementitious material which resides in utilizing cement and coloring matter having inherent different degrees of specific gravity, then reducing said ingredients to a point where both will equally remain in suspension in the same gaseous medium of equal velocity and then mixing said ingredients together.

ANTHONY L. ASHER.
WALTER G. MEYER.